Patented July 11, 1933

1,917,804

UNITED STATES PATENT OFFICE

GEORGE L. MAGOUN, OF NITRO, WEST VIRGINIA, ASSIGNOR TO THE RUBBER SERVICE LABORATORIES COMPANY, OF AKRON, OHIO, A CORPORATION OF OHIO

RUBBER VULCANIZATION ACCELERATOR

No Drawing. Application filed September 14, 1931, Serial No. 562,825. Renewed December 9, 1932.

The present invention relates to the vulcanization of rubber by a new and improved process wherein a new type of rubber vulcanization accelerator is employed. The manufacture and means of employing the preferred new class of rubber vulcanization accelerators are fully set forth hereinafter and will be readily understood from the following description and examples of a preferred mode of carrying out the invention.

The preferred new class of accelerators comprise a reaction product of an aldehyde and a mercaptoarylthiazole derivative of an aldehyde-amine product.

The following is one example of a preferred method of manufacturing one of the new class of accelerating compounds, comprising, for example, the reaction product of crotonaldehyde and the mercaptobenzothiazole derivative of the reaction product of substantially three molecular proportions of acetaldehyde and substantially two molecular proportions of aniline.

Substantially one molecular proportion of mercaptobenzothiazole and substantially one molecular proportion of the product formed from the reaction of substantially three molecular proportions of acetaldehyde and substantially two molecular proportions of aniline, according to the method set forth in U. S. Patent No. 1,659,152 granted to Clayton Olin North, were placed in a suitable vessel and heated slowly with agitation to approximately 145 to 150° C. and then, after the reaction was complete, allowed to cool to approximately 115 to 120° C. Substantially one molecular proportion of crotonaldehyde was added thereto at such a rate that no substantial rise in temperature took place. After the addition of the crotonaldehyde was completed, agitation was preferably continued for a short period of time. The product when cool was a soft resin.

A portion of the material prepared as described above was incorporated in the usual manner in a so-called pure gum rubber stock comprising 100 parts of pale crepe rubber, 5 parts of zinc oxide, 3 parts of sulfur, 1 part of stearic acid, and 1 part of the crotonaldehyde reaction product of the mercaptobenzothiazole derivative of the material formed by reacting substantially three molecular proportions of acetaldehyde and substantially two molecular proportions of aniline.

The rubber stock thus compounded was then cured in the usual manner by heating in a press for different periods of time at the temperature given by 30 pounds of steam pressure per square inch. The vulcanized rubber product on testing was found to possess the following tensile and modulus characteristics:

Table I

| Cure | | Modulus of elasticity in lbs./in.$^2$ at elongations of— | | | Tensile at break in lbs./in.$^2$ | Ultimate elongation percent |
|---|---|---|---|---|---|---|
| Time mins. | Steam pressure lbs. | 300% | 500% | 700% | | |
| 30 | 30 | 348 | 1125 | 4305 | 4800 | 720 |
| 45 | 30 | 398 | 1310 | 4720 | 4840 | 705 |
| 60 | 30 | 390 | 1365 | ------- | 4455 | 690 |

The above data show that the product described above posseses semi-ultra accelerating characteristics when employed in the vulcanization process in the manner described, and produces a rubber product of high modulus and tensile characteristics.

The same accelerator, described in the foregoing example, has also been tested in a rubber "tread" stock. Thus, the following rubber mix was compounded: 100 parts of smoked sheet rubber, 40 parts of carbon black, 10 parts of zinc oxide, 3 parts of sulfur, 3 parts of stearic acid, 1 part of a blended mineral oil and rosin, and 1 part of the crotonaldehyde reaction product of the mercaptobenzothiazole derivative of the material formed by reacting substantially three molecular proportions of acetaldehyde and substantially two molecular proportions of aniline.

The stock thus formed was cured in the usual manner and the product after curing was tested to determine its modulus and tensile properties. The results follow:

Table II

| Cure | | Modulus of elasticity in lbs/in$^2$ at elongations of— | | Tensile at break in lbs/in$^2$ | Ultimate elongation percent |
|---|---|---|---|---|---|
| Time mins. | Steam pressure lbs. | 300% | 500% | | |
| 45 | 30 | 1295 | 3035 | 4155 | 620 |
| 60 | 30 | 1570 | 3510 | 4375 | 590 |
| 75 | 30 | 1695 | 3705 | 4355 | 575 |

These figures show that the accelerator above described also shows desirable properties when employed in a "tread" stock.

Another example of the preferred class of compounds, comprising the reaction product of crotonaldehyde and the mercaptobenzothiazole derivative of the reaction product of substantially three molecular proportions of butyraldehyde and substantially one molecular proportion of aniline, was prepared as follows: Substantially one molecular proportion of a mercaptobenzothiazole and substantially one molecular proportion of the product formed from the reaction of substantially three molecular proportions of butyraldehyde and substantially one molecular proportion of aniline were placed in a suitable vessel and heated slowly, with agitation, to approximately 150 to 155° C. and allowed to cool to approximately 115 to 120° C., whereupon substantially one molecular proportion of crotonaldehyde was added thereto while agitating the reaction mixture. The temperature was maintained, with agitation, at approximately 115 to 120° for a suitable period of time necessary to complete the reaction, for example, approximately three hours, a reflux condenser being preferably attached to the reaction vessel to prevent loss of crotonaldehyde.

A portion of this accelerator was compounded in the usual manner in a rubber stock comprising 100 parts of pale crepe rubber, 5 parts of zinc oxide, 3 parts of sulfur, 1 part of stearic acid, and 1 part of the crotonaldehyde reaction product of the mercaptobenzothiazole derivative of the material formed by reacting substantially three molecular proportions of butyraldehyde and substantially one molecular proportion of aniline.

The rubber mix, after vulcanization by heating in a press for different periods of time, exhibited the modulus and tensile characteristics indicated in Table III.

Table III

| Cure | | Modulus of elasticity in lbs./in.² at elongations of— | | | Tensile at break in lbs./in.² | Ultimate elongation percent |
|---|---|---|---|---|---|---|
| Time Mins. | Steam pressure lbs. | 300% | 500% | 700% | | |
| 30 | 30 | 460 | 1493 | -------- | 4920 | 690 |
| 45 | 30 | 517 | 1663 | -------- | 5050 | 680 |
| 60 | 30 | 500 | 1740 | -------- | 5100 | 675 |

The data set forth in Table III show that the accelerator is particularly valuable in effecting the cure of a rubber product in short periods of time.

Another of the preferred class of accelerators, for example, the reaction product of heptaldehyde upon the mercaptobenzothiazole derivative of the reaction product of formaldehyde and the condensation product of substantially three molecular proportions of acetaldehyde and substantially two molecular proportions of aniline, was prepared as follows: Substantially one molecular proportion of mercaptobenzothiazole and substantially one molecular proportion of the formaldehyde derivative of the reaction product of substantially three molecular proportions of acetaldehyde and substantially two molecular proportions of aniline, prepared according to the method set forth for said formaldehyde derivative as given in U. S. Patent No. 1,659,151 granted to Clayton Olin North, were reacted together and further treated with substantially one molecular proportion of heptaldehyde in a manner analogous to that described for the immediately preceding example. The product, when cool, was a soft, sticky resin.

A portion of the accelerator thus prepared was incorporated in the usual manner in a rubber stock comprising 100 parts of pale crepe rubber, 5 parts of zinc oxide, 3 parts of sulfur, 1 part of stearic acid, and 1 part of the heptaldehyde derivative of the mercaptobenzothiazole reaction product of the formaldehyde derivative of the material formed by reacting substantially three molecular proportions of acetaldehyde and substantially two molecular proportions of aniline.

After vulcanizing the rubber stock thus compounded, the cured rubber product was found to possess the tensile and modulus characteristics set forth in Table IV.

Table IV

| Cure | | Modulus of elasticity in lbs./in.² at elongations of— | | | Tensile at break in lbs./in.² | Ultimate elongation percent |
|---|---|---|---|---|---|---|
| Time mins. | Steam pressure lbs. | 300% | 500% | 700% | | |
| 30 | 30 | 441 | 1358 | 4430 | 5125 | 735 |
| 45 | 30 | 514 | 1665 | -------- | 4970 | 680 |
| 60 | 30 | 508 | 1693 | -------- | 4950 | 670 |

These data show that the accelerator employed in the above example also possesses exceptional accelerating properties when employed in a rubber mix. In fact the particular stock set forth has reached the maximum cure in approximately 30 minutes heating at 30 pounds of steam pressure.

Another of the preferred class of compounds, for example, the reaction product of crotonaldehyde and the mercaptobenzothiazole derivative of methylene-dipiperidine, was prepared as follows: Substantially one molecular proportion each of mercaptobenzothiazole and methylene-dipiperidine were placed in a suitable vessel and heated slowly, with agitation, to approximately 145 to 150° C. and allowed to cool to approximately 115 to 120°. Substantially one molecular proportion of crotonaldehyde was added at such a rate that the temperature of the mixture did not rise above approximately 120°. After the addition of the crotonaldehyde was completed, the mixture was maintained at a refluxing temperature, with agitation, for a suitable period of time necessary to complete the reaction, for example, approximately one hour. The cooled product was a soft resin.

In order to determine the value of this product as an accelerator, a portion was incorporated in a rubber stock comprising 100 parts of pale crepe rubber, 5 parts of zinc oxide, 3 parts of sulfur, 1 part of stearic acid, and 1 part of the crotonaldehyde reaction product of the mercaptobenzothiazole derivative of methylene-dipiperidine.

After vulcanizing the above rubber stock in the usual manner, a cured rubber product was obtained, having the following physical properties:

Table V

| Cure | | Modulus of elasticity in lbs./in.² at elongations of— | | | Tensile at break in lbs./in.² | Ultimate elongation percent |
|---|---|---|---|---|---|---|
| Time mins. | Steam pressure lbs. | 300% | 500% | 700% | | |
| 30 | 30 | 483 | 1565 | -------- | 4625 | 685 |
| 45 | 30 | 510 | 1638 | -------- | 4960 | 680 |
| 60 | 30 | 498 | 1720 | -------- | 4755 | 675 |

The above figures show that the accelerator used in this case also possesses desirable characteristics.

Another example of the preferred class of compounds, comprising the reaction product of butyraldehyde and the mercaptobenzothiazole derivative of anhydro-formaldehyde-aniline, was prepared as follows: Substantially one molecular proportion each of mercaptobenzothiazole and anhydro-formaldehyde-aniline were placed in a suitable vessel and heated slowly, with agitation, to approximately 150 to 155° C. and then allowed to cool to approximately 115 to 120° C. Substantially one molecular proportion of butyraldehyde was added thereto and the mixture maintained at a refluxing temperature, with agitation, for a suitable period of time necessary to complete the reaction, for example, approximately three hours. The cooled product was a soft resin.

A portion of this product was compounded in a rubber stock comprising 100 parts of pale crepe rubber, 5 parts of zinc oxide, 3 parts of sulfur, 1 part of stearic acid, and 1 part of the butyraldehyde reaction product of the mercaptobenzothiazole derivative of anhydro-formaldehyde-aniline.

The stock was cured in the usual manner and found upon testing to possess the characteristics set forth in Table VI.

Table VI

| Cure | | Modulus of elasticity in lbs./in.² at elongations of— | | | Tensile at break in lbs./in.² | Ultimate elongation percent |
|---|---|---|---|---|---|---|
| Time mins. | Steam pressure lbs. | 300% | 500% | 700% | | |
| 30 | 30 | 205 | 460 | 1675 | 3665 | 840 |
| 45 | 30 | 275 | 613 | 2485 | 4270 | 800 |
| 60 | 30 | 296 | 739 | 3010 | 4500 | 800 |

These data set forth in Table VI show that the compound above described also possesses valuable accelerating properties.

Another example of the preferred class of accelerators, comprising the reaction product of acetaldehyde and the mercaptobenzothiazole derivative of heptylidene aniline, was prepared as follows: Substantially one molecular proportion each of mercaptobenzothiazole and heptylidene aniline were placed in a suitable vessel and heated slowly, with agitation, to approximately 145 to 150° C. and allowed to cool to approximately 120 to 125° C. Substantially one molecular proportion of acetaldehyde, preferably in the gaseous form, was added while agitating and maintaining the reaction mixture at approximately 120 to 125° C. The cooled product was a resin.

A portion of this product was incorporated in a rubber stock of the following composition: 100 parts of pale crepe rubber, 5 parts of zinc oxide, 3 parts of sulfur, 1 part of stearic acid, and 1 part of the acetaldehyde reaction product of the mercaptobenzothiazole derivative of heptylidene aniline.

This stock was cured and the vulcanized product submitted to physical tests. The results follow in Table VII.

Table VII

| Cure | | Modulus of elasticity in lbs./in.² at elongations of— | | | Tensile at break in lbs./in.² | Ultimate elongation percent |
|---|---|---|---|---|---|---|
| Time mins. | Steam pressure lbs. | 300% | 500% | 700% | | |
| 30 | 30 | 462 | 1560 | -------- | 5100 | 690 |
| 45 | 30 | 499 | 1753 | -------- | 4575 | 675 |
| 60 | 30 | 509 | 1665 | -------- | 4130 | 640 |

From the data hereinbefore set forth it is conclusively shown that the new class of materials comprise a group of particularly valuable vulcanization accelerators.

Other examples of the preferred new class of accelerators have been prepared and employed as vulcanization accelerators. Thus, the crotonaldehyde derivative of the mercaptobenzothiazole reaction product of the formaldehyde derivative of the material formed by reacting substantially three molecular proportions of acetaldehyde and substantially two molecular proportions of aniline, the crotonaldehyde derivative of the reaction product of mercaptobenzothiazole and methylene-para-toluidine, and the crotonaldehyde derivative of the reaction product of substantially one molecular proportion of mercaptobenzothiazole and substantially two molecular proportions of ethylidene aniline have been prepared in a manner similar to that described above and employed as accelerators in the rubber vulcanization process.

In like manner, other reaction products of aldehydes and mercaptoarylthiazole derivatives of aldehyde-amines may be employed as accelerators in the vulcanization of rubber. Thus, mercaptobenzothiazole, mercaptotolylthiazole, mercaptoxylylthiazole, mercaptonaphthothiazole, and the like, may be reacted with formaldehyde - beta - naphthylamine, crotonaldehyde - aniline, butyraldehyde -n- propyl amine, butyraldehyde-para-amino-dimethyl-aniline, the reaction product of substantially three molecular proportions of heptaldehyde and substantially one molecular proportion of 2,4-diamino-diphenylamine, and the like, and the products so formed may be further reacted with formaldehyde, acetaldehyde, crotonaldehyde, benzaldehyde, furfural and the like, and employed as accelerators in the vulcanization of rubber.

The present invention is limited only as defined in the following claims, in which it is intended to claim all novelty inherent in the invention as broadly as is permissible in view of the prior art.

What is claimed is:

1. The process of vulcanizing rubber which comprises heating rubber and sulfur in the presence of an accelerator comprising a reaction product of an aldehyde and a mercaptoarylthiazole derivative of an aldehyde-amine reaction product.

2. The process of vulcanizing rubber which comprises heating rubber and sulfur in the presence of an accelerator comprising a reaction product of an aldehyde and a mercaptobenzothiazole derivative of an aldehyde-amine reaction product.

3. The process of vulcanizing rubber which comprises heating rubber and sulfur in the presence of an accelerator comprising a reaction product of an aliphatic aldehyde and a mercaptobenzothiazole derivative of an aldehyde-amine reaction product.

4. The process of vulcanizing rubber which comprises heating rubber and sulfur in the presence of an accelerator comprising a reaction product of an aliphatic aldehyde and a mercaptobenzothiazole derivative of an aliphatic aldehyde-aromatic amine reaction product.

5. The process of vulcanizing rubber which comprises heating rubber and sulfur in the presence of an accelerator comprising a reaction product of an aliphatic aldehyde and a mercaptobenzothiazole derivative of an aliphatic aldehyde-aniline reaction product.

6. The process of vulcanizing rubber which comprises heating rubber and sulfur in the presence of an accelerator comprising a reaction product of an aldehyde and a mercaptobenzothiazole derivative of an aldehyde derivative of a Schiff's base.

7. The process of vulcanizing rubber which comprises heating rubber and sulfur in the presence of an accelerator comprising a reaction product of an aliphatic aldehyde and a mercaptobenzothiazole derivative of an aliphatic aldehyde derivative of a Schiff's base.

8. The process of vulcanizing rubber which comprises heating rubber and surfur in the presence of an accelerator comprising a reaction product of an aliphatic aldehyde and a mercaptobenzothiazole derivative of the reaction product of substantially three molecular proportions of butyraldehyde and substantially one molecular proportion of aniline.

9. The process of vulcanizing rubber which comprises heating rubber and sulfur in the presence of an accelerator comprising a reaction product of crotonaldehyde and a mercaptobenzothiazole derivative of the reaction product of substantially three molecular proportions of butyraldehyde and substantially one molecular proportion of aniline.

10. The process of vulcanizing rubber which comprises heating rubber and sulfur in the presence of an accelerator comprising the product formed by reacting substantially one molecular proportion of mercaptobenzothiazole with substantially one molecular proportion of the reaction product of substantially three molecular proportions of butyraldehyde and substantially one molecular proportion of aniline and further reacting the material thus formed with substantially one molecular proportion of crotonaldehyde.

11. The vulcanized rubber produced by heating rubber and sulfur in the presence of an accelerator comprising a reaction product of an aldehyde and a mercaptoarylthiazole derivative of an aldehyde-amine reaction product.

12. The vulcanized rubber produced by heating rubber and sulfur in the presence of an accelerator comprising a reaction product of an aldehyde and a mercaptobenzothiazole derivative of an aldehyde-amine reaction product.

13. The vulcanized rubber produced by heating rubber and sulfur in the presence of an accelerator comprising a reaction product of an alipathic aldehyde and a mercaptobenzothiazole derivative of an aldehyde-amine reaction product.

14. The vulcanized rubber produced by heating rubber and sulfur in the presence of an accelerator comprising a reaction product of an aliphatic aldehyde and a mercaptobenzothiazole derivative of an aliphatic aldehyde-aromatic amine reaction product.

15. The vulcanized rubber produced by heating rubber and sulfur in the presence of an accelerator comprising a reaction product of an aliphatic aldehyde and a mecaptobenzothiazole derivative of an aliphatic aldehyde-aniline reaction product.

16. The vulcanized rubber produced by heating rubber and sulfur in the presence of an accelerator comprising a reaction product of an aldehyde and a mercaptobenzothiazole derivative of an aldehyde derivative of a Schiff's base.

17. The vulcanized rubber produced by heating rubber and sulfur in the presence of an accelerator comprising a reaction product of an aliphatic aldehyde and a mercaptobenzothiazole derivative of an aliphatic aldehyde derivative of a Schiff's base.

18. The vulcanized rubber produced by heating rubber and sulfur in the presence of an accelerator comprising a reaction product of an aliphatic aldehyde and a mercaptobenzothiazole derivative of the reaction product of substantially three molecular proportions of butyraldehyde and substantially one molecular proportion of aniline.

19. The vulcanized rubber produced by heating rubber and sulfur in the presence of an accelerator comprising a reaction product of crotonaldehyde and a mecaptobenzothiazole derivative of the reaction product of substantially three molecular proportions of butyraldehyde and substantially one molecular proportion of aniline.

20. The vulcanized rubber produced by heating rubber and sulfur in the presence of an accelerator comprising the product formed by reacting substantially one molecular proportion of mercaptobenzothiazole with substantially one molecular proportion of the reaction product of substantially three molecular proportions of butyraldehyde and substantially one molecular proportion of aniline and further reacting the material thus formed with substantially one molecular proportion of crotonaldehyde.

In testimony whereof, I hereunto affix my signature.

GEORGE L. MAGOUN.